Oct. 17, 1950  E. J. CARTER  2,525,864
METHOD OF MAKING ADHESIVE TAPE
Filed Aug. 7, 1947
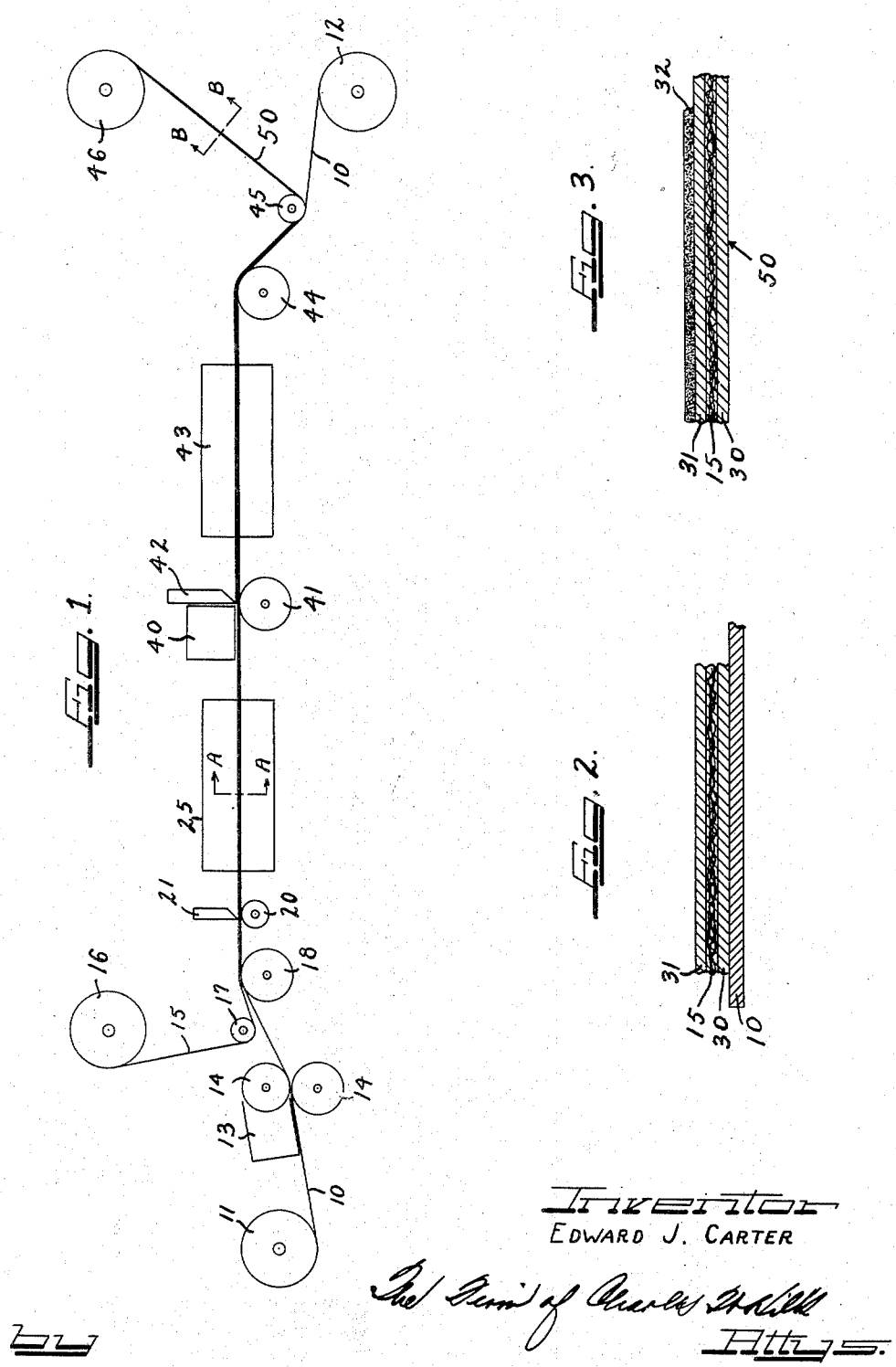
Inventor
EDWARD J. CARTER Patented Oct. 17, 1950

2,525,864

UNITED STATES PATENT OFFICE 2,525,864

METHOD OF MAKING ADHESIVE TAPE

Edward John Carter, New York, N. Y., assignor to William M. Scholl, Chicago, Ill.

Application August 7, 1947, Serial No. 767,162

2 Claims. (Cl. 18—59)

This invention relates to a method of making a sheet material or tape comprising, as a base, a transparent resinous film containing a reinforcing network of felted fibers, said film having superimposed thereon a layer of a pressure-sensitive adhesive.

According to the present invention, a structure such as that disclosed hereinabove may be prepared by depositing a layer of a solution of a film-forming resin on a casting surface, depositing a web of porous or bibulous paper or the like on the layer of resin solution, compressing the layer of resin solution between the casting web and the paper web to force the resin solution upwardly through the paper web so that the latter is embedded therein, evaporating the solvent from the resin solution to form a laminated resin film having said paper embedded therein, stripping the resin film from the casting surface, and coating the resulting structure with a layer of a pressure-sensitive or other adhesive.

It is therefore an important object of the present invention to provide a method for making a pressure-sensitive adhesive film of the structure indicated.

Other and further objects of the present invention will become apparent from the following description and appended claims.

To prepare the structure of the present invention, I can employ an appropriate solution of any of the well known film-forming resins, such as cellulose acetate, cellulose acetate butyrate, ethyl cellulose or other cellulose ethers, nylons (superpolyamides), polyvinyl alcohol, polyvinyl alcohol acetate, polyvinyl chloride, polyvinyl chloride acetate, polyvinyl butyral, polystyrene, polymerized methyl methacrylate or the like. These solutions may contain an amount of plasticizer adapted to confer upon the resulting film any desired degree of flexibility.

By way of example, the drawing shows the preparation of a resinous film from a solution including 38 parts cellulose acetate, 12 parts diethyl phthalate and 50 parts acetone. More particularly, Figure 1 is a diagrammatic representation, in side elevation, of an apparatus for preparing the tape of this invention;

Figure 2 is a vertical cross-sectional view taken along the line A—A of Figure 1 through the product in an intermediate stage of production; and Figure 3 is a vertical cross-sectional view taken along the line B—B of Figure 1 through the finished product.

In Figure 1, the reference numeral 10 indicates a casting web that is unwound from a roller 11 at the left-hand end of the apparatus and extends through the length of the apparatus for reeling up on a roller 12 at the right-hand end of the apparatus. The casting web 10 may be fabricated from pyroxylin-coated textile material. In such a web, the pyroxylin coating facilitates the stripping of the finished resinous film from the casting web.

The casting web 10 is continuously advanced through the apparatus of Figure 1. As shown, the above disclosed film-forming resin solution is deposited on the casting web 10 at the left-hand side of the apparatus from a suitable box, hopper or distributor 13. The web with the superimposed resin solution then passes between rollers 14 that serve to distribute the film-forming solution evenly over the top of the casting web. A web of porous or bibulous paper or tissue of the same width as the casting web 10 is indicated by the reference numeral 15, and, as shown, is unreeled from a roller 16 to pass under another roller 17 disposed with its lowest point somewhat below the top of a roller 18 over which the casting web 10 is advanced. As a result, the paper web 15 is tensioned when contacting the film-forming layer above the roller 18 so that the film-forming solution is forced upwardly through the permeable paper web 15, displacing air contained therein. The resin solution thus permeates the web 15 and forms distinct layers on the top and bottom thereof. While the resin solution is compressed between the casting web 10 and the paper web 15, all the resin solution is not displaced from the underside of the web 15.

The laminate thus obtained passes between a roller 20 and a doctor knife 21 that serves to remove excess resin solution from the top of the web 15 and into a dryer 25 where the solvent is evaporated from the resin solution. The laminate thus obtained and including a resinous film containing the paper web 15 as a reinforcement is shown in greater detail in Figure 2 as including the casting web 10, a layer of resin 30, a paper web 15 impregnated with said resin and an uppermost resin layer 31.

After passing through the dryer 25, the resinous film has distributed over the top thereof a solution of a pressure-sensitive adhesive, as by means of a box, hopper or other distributor 40 followed by an opposed roller 41 and a doctor knife 42. The thus coated laminate next passes through a dryer 43 where the solvent is evaporated off from the adhesive solution. The adhesive-coated laminate passes out of the dryer 43 over a roller 44 and under another roller 45, where the finished product (indicated by reference numeral 50) is stripped off from the casting web 10 which latter is wound on a roller 12. The finished product is wound on a roller 46. The structure of the finished product is shown in greater detail in Figure 3 as including the paper web 15 impregnated with resin and enclosed between a lower resin layer 30 and an upper resin layer 31. The latter has attached thereto a layer 32 of pressure-sensitive adhesive.

To make up the layer of pressure-sensitive adhesive, I may employ any suitable solution of any one of the conventional pressure-sensitive adhesive compositions, for instance, the well known combination of rubber with resinous material, in particular, rosin. By way of example, I may employ a 30% solution in a suitable solvent of a composition including from 45 to 35 parts by weight of "Vistanex B-100," from 7½ to 12½ parts "Vistanex B-12," from 15 to 25 parts by weight "Amber BX" (factice) and from 25 to 35 parts by weight of "Vistac No. 1."

The fiber reinforced resinous film coated with a pressure-sensitive adhesive obtained as described hereinabove, is distinguished by flexibility, resistance against tearing and against peeling of the adhesive layer from the resinous layer. When the adhesive is properly chosen in reference to the backing film material, the tape may be wound up on itself without any need for any special precautions to guard against sticking of the adhesive to the underside of the tape.

If desired, other types of adhesive may be substituted for the pressure-sensitive layer disclosed hereinabove.

The application of the adhesive to the fiber-reinforced backing while the latter is still on the casting strip aids in preventing wrinkling, curling or distortion of the backing due to the evaporation of the solvent from the adhesive and also facilitates distribution of the adhesive over the backing.

It should be understood that many details of procedure, composition and structure may be varied within a wide range without departing from the principles of this invention, and it is, therefore, not my purpose to limit the patent granted on this application otherwise than necessitated by the scope of the appended claims.

I claim as my invention:

1. A method of making pressure sensitive adhesive tape which comprises depositing a layer of a solution of a film-forming resin upon a traveling flexible casting surface, flexing said casting surface over a cylindrical support with said layer outermost, tensioning a strip of bibulous paper against said layer while said casting surface is backed by said support to thereby force said resin solution into and through the interstices of said paper, evaporating the solvent from said resin solution while said strip is on said casting surface to form a paper-reinforced resin film, depositing a pressure-sensitive adhesive on said resin film while said strip is still on said casting surface, and stripping the resulting structure from said casting surface.

2. In the method of preparing a transparent, fiber-reinforced resinous film, the steps which comprise depositing a layer of a solution of a film-forming resin upon a traveling flexible casting surface, flexing said casting surface over a cylindrical rigid support with said layer outermost, tensioning a web of bibulous fibrous material against said layer while said casting surface is backed by said support to thereby force said resin solution into and through the interstices of said fibrous material and evaporating the solvent from said resin solution while said web is on said casting surface to form a fiber-reinforced resin film.

EDWARD JOHN CARTER.

REFERENCES CITED

The following references are of record in the file of this patent:

UNITED STATES PATENTS

| Number | Name | Date |
| --- | --- | --- |
| 1,824,690 | Schneider | Sept. 22, 1931 |
| 2,199,228 | Obenshain et al. | Apr. 30, 1940 |
| 2,246,872 | Beaune | June 24, 1941 |
| 2,252,204 | Reilly | Aug. 12, 1941 |
| 2,257,139 | Tone et al. | Sept. 30, 1941 |
| 2,442,876 | Pearson | June 8, 1948 |